Figure 1:
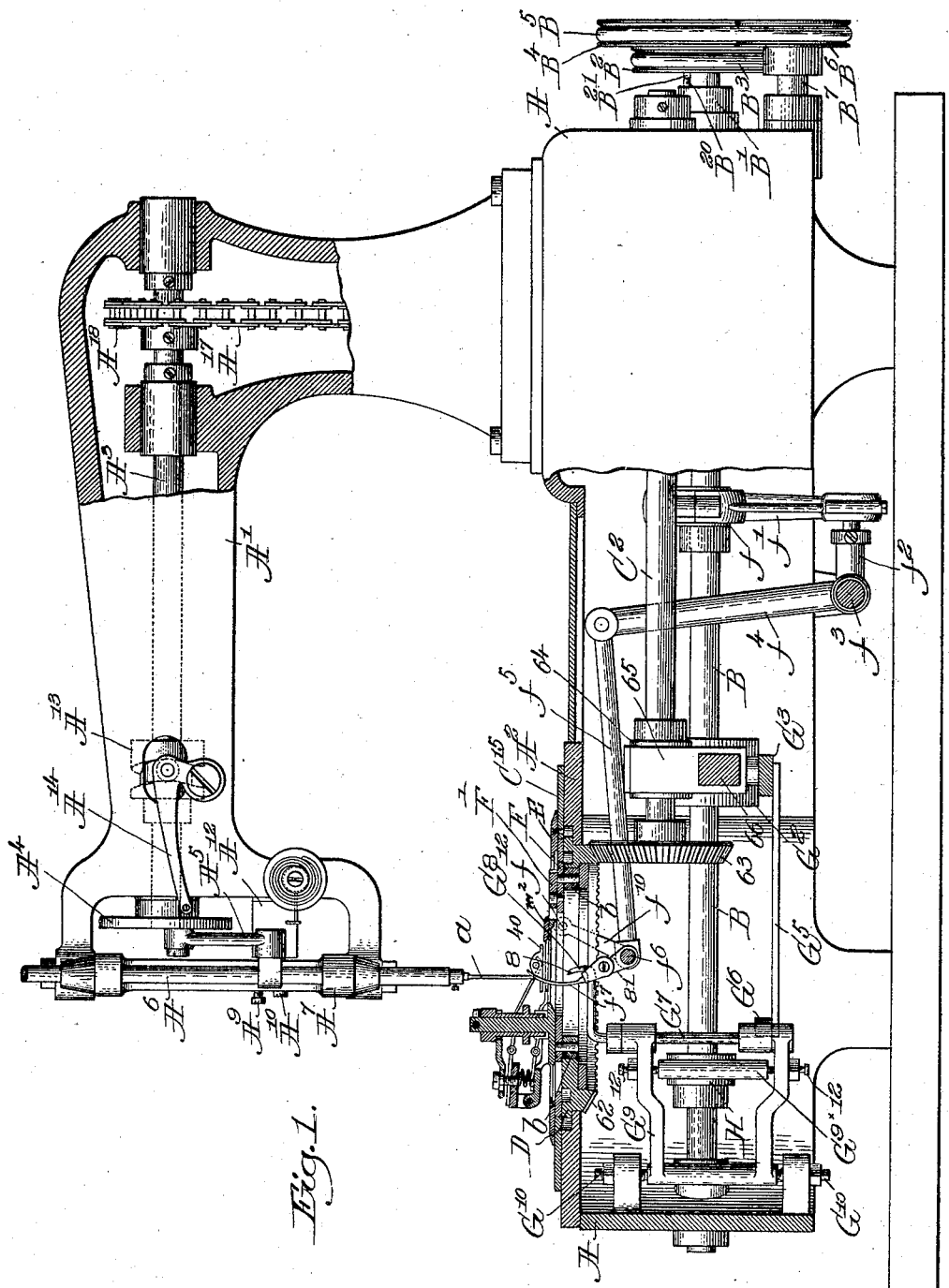

No. 696,699. Patented Apr. 1, 1902.
R. W. THOMSON.
BUTTONHOLE STITCHING MACHINE.
(Application filed Aug. 5, 1901.)
(No Model.) 2 Sheets—Sheet 1.

Witnesses:
Fred S. Greenleaf
Edward F. Allen

Inventor:
Robert W. Thomson,
by Crosby & Gregory
attys.

No. 696,699. Patented Apr. 1, 1902.
R. W. THOMSON.
BUTTONHOLE STITCHING MACHINE.
(Application filed Aug. 5, 1901.)
(No Model.) 2 Sheets—Sheet 2.
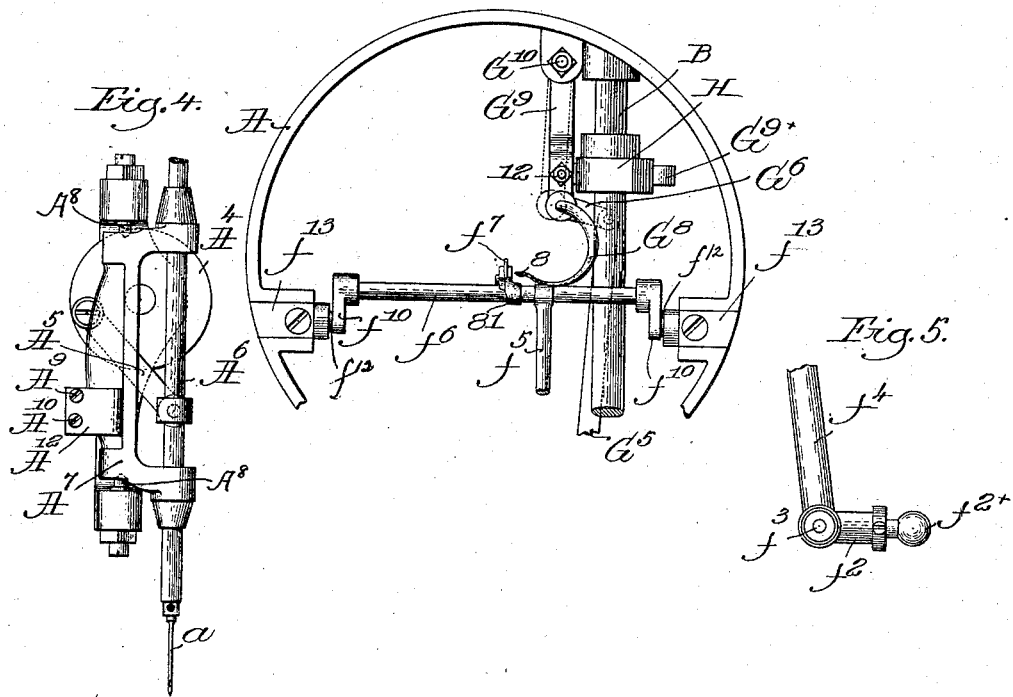

UNITED STATES PATENT OFFICE.

ROBERT W. THOMSON, OF LYNN, MASSACHUSETTS, ASSIGNOR TO REECE BUTTONHOLE MACHINE COMPANY, OF BOSTON, MASSACHUSETTS, A CORPORATION OF MAINE.

BUTTONHOLE-STITCHING MACHINE.

SPECIFICATION forming part of Letters Patent No. 696,699, dated April 1, 1902.

Original application filed January 20, 1892, Serial No. 418,670. Divided and this application filed August 5, 1901. Serial No. 70,859. (No model.)

*To all whom it may concern:*

Be it known that I, ROBERT W. THOMSON, a citizen of the United States, residing at Lynn, in the county of Essex and State of Massachusetts, have invented an Improvement in Buttonhole-Stitching Machines, of which the following description, in connection with the accompanying drawings, is a specification, like characters on the drawings representing like parts.

The invention in buttonhole-stitching machines herein to be specifically described and claimed relates to the stitch-forming mechanism for manipulating the threads in the formation of an overedge-stitch.

One feature of invention relates to imparting lateral movement to a bearing carrying the spreader and also oscillating said spreader in its bearing.

Another feature of invention relates to means for actuating the looper.

Other features of invention will be hereinafter specifically described, and set forth in the claims.

Figure 1 is a view, partially in elevation and in section, showing the features to be claimed in this divisional application and actuating means for the same. Fig. 2 is a detail showing the spreader viewed from another point than that shown in Fig. 1. Fig. 3 is a detail in top or plan view of the spreader and its actuating means, said figure also showing the ears for sustaining the shaft carrying the looper. Fig. 4 is a detail showing part of the needle-gate, and Fig. 5 a detail of the lever $f^4$.

Referring to the drawings, A represents the lower part of the framework; A', the overhanging arm; $A^2$, a table-plate secured to the framework; $A^3$, the needle-bar-actuating shaft, sustained in the arm A' and provided at its front end with a crank $A^4$, connected by a link $A^5$ with a suitable collar on the needle-bar $A^6$, having a needle $a$. The needle is reciprocated in suitable bearings of a gate $A^7$, mounted upon studs $A^8$, (see Fig. 4,) shown as pointed screws. The gate has two screws $A^9$ $A^{10}$, extended through an ear thereof. (See Fig. 4.) The screw $A^9$ is adapted to be screwed more or less through the said ear to contact with a lug $A^{12}$, connected with the overhanging arm, to determine the exact position for the needle-bar gate and needle $a$ with relation to the usual throat through which the needle descends in making the stitch, the screw $A^{10}$ entering said lug and fastening said gate in its adjusted position. By these screws it is possible to adjust the gate more or less about its pivotal point, so as to bring the needle $a$ in exactly the proper working position with relation to the parts with which it coöperates in the production of an overedge-stitch, such adjustment securing the desired length of depth-stitch.

The shaft $A^3$ has fast upon it a cam-hub $A^{13}$, which actuates a take-up $A^{14}$. The shaft $A^3$ derives its rotation from a chain $A^{17}$, set in motion by a suitable sprocket-wheel (not shown) fast on the main shaft B, said sprocket-chain embracing a sprocket-wheel $A^{18}$ on the shaft $A^3$. The shaft B has fast upon it outside the framework a collar B', having a suitable pin or projection $B^{20}$, which forms part of a clutch, the second part of the clutch being a pin or projection $B^{21}$, extended from a pulley $B^2$, mounted loosely upon said shaft and driven substantially constantly by a suitable belt, as $B^3$, driven from any suitable source of motion. The pulley $B^2$ has secured to or forming part of it a second pulley $B^4$, driven by a belt $B^5$, extended over a pulley $B^6$, secured to a shaft $B^7$, adapted, as described in said application, to actuate a shaft instrumental in turning the work-clamp, to be described, backwardly into its starting position after having completed the stitching of a buttonhole.

The table-plate $A^2$ is recessed to receive a ring D, having teeth 62, said ring being rotated when stitching a buttonhole through a bevel-pinion 63, fast on a shaft $C^2$. The shaft $C^2$ is sustained in a bearing 64, which is raised and lowered at proper times, as described in said application, to cause the teeth 63 to engage the teeth 62 of the ring D and move the same in one direction and to disengage the wheel 63 from the teeth 62 to permit the ring D to be returned by other means fully described in said application.

The goods or material to be stitched is held between the under members $m^2$ and the upper members 40 of a cloth-clamp, said members being carried by a plate F', mounted upon a base-plate F, fitted to slide to and fro in a circular clamp-carrier E, sustained by the table-plate and held in operative condition therein by means of a raceway $C^{15}$, secured by suitable screws to the table-plate. The underside of the base-plate F has suitable roller-studs $b$, which are acted upon by the inner cam-wall of the rotating ring D, said wall being so shaped as to slide the clamp longitudinally while stitching the sides of a buttonhole. The clamp-carrier E is rotated with the ring D when stitching about the opposite ends of a buttonhole and is restrained from rotation in said raceway when the base-plate F is being slid therein.

The curved needle $f^7$ to carry the under thread through the slit of the buttonhole is secured by a suitable screw to a projection 81 from a shaft $f^6$, having at its opposite ends like arms $f^{10}$, the upper ends of which have studs $f^{12}$, which are pivotally mounted upon stands $f^{13}$, (see Fig. 3,) mounted upon the under part of the framework. The shaft $f^6$ has connected with it a link $f^5$, jointed to a lever $f^4$ of a pivoted rock-shaft $f^3$, a short arm $f^2$ of said lever having a ball-ended projection $f^{2\times}$, (see Fig. 5,) which is embraced and clamped by the lower end of an arm $f'$, the upper end of which has a strap to surround an eccentric $f$, suitably secured to the shaft B. The pivotal point of the arms $f^{10}$ in the stands $f^{13}$ is near the lowerside of the material the edge of which is being overstitched, and consequently the movement of the curved needle $f^7$ is in such a path that it will not in its movement contact with the edge of the slit with sufficient force to displace or pucker the said edge, and consequently the overstitched edge is kept even and straight. Further, the ball-joint connection between the lever $f^4$ and the arm $f'$ enables the curved-needle-actuating means to operate reliably.

The machine is provided with a loop-spreader $G^8$, (shown as having near its end a notch 8.) The shaft $G^7$ of the spreader is mounted in a bearing $G^9$, pivoted, as herein shown, upon pointed screws $G^{10}$. The bearing $G^9$ between its ends has, as shown, other point-screws 12, which serve to connect loosely with said bearing a finger $G^{9\times}$, the pivoted end of the finger having a projection 10. A cam H, secured to the shaft B, rotates between said finger and its projection 10 (see Figs. 2 and 3) and moves the bearing $G^9$ and the spreader horizontally or laterally. The lower end of the spreader-shaft $G^7$ has connected with it the hub of an arm $G^6$, to which is joined a link $G^5$, in turn connected at its opposite end with a lever $G^3$, suitably pivoted on the lower framework and provided with a roller or other stud which enters a cam-groove in a hub $G^2$, secured to the shaft B, said hub in its rotation acting through the lever $G^3$ and link $G^5$ to oscillate the shaft $G^7$ and loop-spreader $G^8$ at the proper times in its bearing.

In the operation of stitching a buttonhole the carrier $f^7$ for the under thread rises and crosses the upper edge of the material held in the clamp and presents a loop of its thread in such position that the needle carrying the upper thread will descend through the loop of under thread, the needle carrying the upper thread penetrating the material back from its edge for the distance desired for the depth-stitch, and the under-thread carrier in the meantime descends or moves back to the under side of the material, leaving a loop of under thread about the shank of the needle carrying the upper thread. The loop of upper thread presented by the needle below the material is entered by the loop-spreader $G^8$ in its forward motion, which takes said loop of upper thread and carries it across the buttonhole-slot, opening said loop of upper thread in the path of movement of the under-thread carrier as the latter again rises, said under-thread carrier passing through the spread or opened loop of upper thread. During the operation of spreading the loop of upper thread the needle-bar $a^6$ is made to rise rapidly, that it may get out of the way of the under-thread carrier as the latter rises through the spread or opened loop of upper thread, and the under-thread carrier again presents its thread above the material, as before described, that a loop of its thread may be entered by the needle carrying the upper thread at its next descent. Mounting the shank of the loop-spreader in the bearing $G^9$ allows the point of the spreader while spreading the loop of under-thread to get quickly out of the way of the rising under-thread carrier, so that the concaved side thereof as it rises will not strike the loop-spreader.

All the parts hereinbefore described are shown and fully described in said application from which this is a divisional application, and the clamp-carrier will in practice be rotated as fully provided for in said application.

Having described my invention, what I claim, and desire to secure by Letters Patent, is—

1. The combination with upper and under needles of a buttonhole-stitching machine, and actuating means therefor, of a loop-spreader, a movable bearing sustaining the shank of said spreader, means to impart a lateral movement to the loop-spreader bearing, and means to impart a rotative movement to the loop-spreader in its bearing in the formation of a buttonhole-stitch.

2. In a buttonhole-stitching machine, a cloth-clamp to hold the material to be stitched, stitch-forming mechanism including an upper and an under thread carrying needle, a loop-spreader having a shaft, a bearing for said shaft, means to impart at the proper time a rotary movement to said loop-spreader, and means to move said bearing and loop-spreader bodily that the spreader may take the loop of upper thread and spread said loop for the entrance of the needle carrying the under thread as the latter rises past the edge to be overstitched.

3. In a machine for stitching buttonholes, a work-clamp to hold the material to be stitched, an eye-pointed upper-thread-carrying needle to penetrate the material back from its edge to be overstitched, means to actuate said needle for stitching, a curved under-thread-carrying needle located below the material, a pivoted carrier for said curved needle, a link connected with said curved-needle carrier, a lever connected with said link, an eccentric-strap, means to move it, and a ball connection between said eccentric-strap and lever.

4. In a buttonhole-stitching machine, the combination with an eye-pointed needle and an under-thread-carrying needle, of a bearing pivoted near one end, a loop-spreader having its shaft mounted in said bearing, means to swing said bearing about its pivot, and means to rotate said shaft in said bearing, whereby said spreader while being rotated in the bearing may have a bodily lateral movement given to its shaft.

5. In a buttonhole-stitching machine, the following instrumentalities, viz: a needle-bar having a needle to carry an upper thread, actuating means therefor, a vertical shaft provided with a loop-spreader, a pivoted bearing in which the shaft of said spreader is mounted, an under-thread carrier, means to actuate the under-thread carrier to move it across the edge of the material to be overstitched, and means to move said bearing with the spreader-shaft and spreader laterally to thereby remove the spreader quickly out of the path of the ascending under-thread carrier.

6. In a buttonhole-sewing machine, a needle-bar having an eye-pointed upper-thread-carrying needle, a bearing to contain said needle-bar, means to reciprocate said needle-bar in said bearing, an under-thread-carrier adapted to carry a thread through the buttonhole and present it under the descending needle, and means to adjust said bearing and maintain it in adjusted position, that the needle may penetrate the material back from the edge of the slit for the desired distance to insure the desired width of overedge-stitch, as may be required.

7. In a buttonhole-sewing machine, a work-clamp, a needle-throat, a vertically-arranged needle-bar having an eye-pointed needle, a horizontally-arranged shaft having a connected under-thread carrier, arms supporting said shaft, pivots sustained in a stationary part of the frame of the machine, located near the level of the under side of the material to be held in the work-clamp, and means for actuating said shaft that the under-thread carrier, as it rises to interlock its thread with the needle-thread, will rise through the slit in the material in substantially a vertical line, thereby obviating straining the material in the direction of the width of the buttonhole-slit.

In testimony whereof I have signed my name to this specification in the presence of two subscribing witnesses.

ROBERT W. THOMSON.

Witnesses:
GEO. W. GREGORY,
EDITH M. STODDARD.